(12) United States Patent
Maas et al.

(10) Patent No.: US 6,303,544 B1
(45) Date of Patent: Oct. 16, 2001

(54) MODIFIED CELLULOSE PRODUCTS

(75) Inventors: Antonius Franciscus Maas, Baexem; Goeran Einar Kloow, Elst, both of (NL); Oliver Ruppert, Aanekoski (FI)

(73) Assignee: Metsa Specialty Chemicals OY (FI)

( * ) Notice: Subject to any disclaimer, the term of this patent is extended or adjusted under 35 U.S.C. 154(b) by 0 days.

(21) Appl. No.: 09/394,711

(22) Filed: Sep. 13, 1999

(30) Foreign Application Priority Data

Mar. 16, 1999 (FI) .......................................... 990585

(51) Int. Cl.$^7$ ................................ C09K 7/02; C09K 7/04
(52) U.S. Cl. ..................... 507/112; 507/143; 507/215; 507/216; 507/270; 507/271; 106/172.1
(58) Field of Search ................. 106/172.1; 507/112, 507/143, 215, 216, 270, 271

(56) References Cited

U.S. PATENT DOCUMENTS

| | | | |
|---|---|---|---|
| 3,762,476 | 10/1973 | Gall | 166/294 |
| 3,978,928 | * 9/1976 | Clampitt | 166/294 |
| 4,018,286 | 4/1977 | Gall et al. | 166/294 |
| 4,466,890 | 8/1984 | Briscoe | 507/201 |
| 4,486,335 | * 12/1984 | Majewicz | 516/106 |
| 4,683,954 | * 8/1987 | Walker et al. | 166/307 |
| 4,825,949 | 5/1989 | Ryles et al. | 166/294 |
| 5,246,073 | * 9/1993 | Sandiford et al. | 166/295 |
| 5,263,540 | * 11/1993 | Dovan et al. | 166/278 |
| 5,486,312 | * 1/1996 | Sandiford et al. | 516/106 |
| 5,624,886 | * 4/1997 | Dawson et al. | 507/217 |

FOREIGN PATENT DOCUMENTS

| | | |
|---|---|---|
| 0 258 968 | 3/1988 | (EP) . |
| 834089 | 5/1981 | (RU) . |
| 1802812 | 3/1993 | (RU) . |
| 2001936 | 10/1993 | (RU) . |
| 2011675 | 4/1994 | (RU) . |
| 2013435 | 4/1994 | (RU) . |

OTHER PUBLICATIONS

XP–002142338 and RU 2 001 936 C, Volgo Urals Hydro–Carbon Raw Mat. Mining, Oct. 30, 1993.
Derwent, AN—1994–072943[09]; A.I. Chernyakhovskii et al. Oct. 1990.
Finnish Search Report dated Oct. 5, 1999.
Gorodnov et al., "Preparation of polymer drilling muds based on CMC," *Neftianoje Khoziajstvo*, Iss. No. 1, Section "Drilling of Wells".

* cited by examiner

*Primary Examiner*—Jill Warden
*Assistant Examiner*—LaToya I. Cross
(74) *Attorney, Agent, or Firm*—Millen, White, Zelano & Branigan, P.C.

(57) ABSTRACT

A modified cellulose product comprising cellulose ether, such as carboxymethyl cellulose, hydroxyethyl cellullose, carboxymethyl hydroxyethyl cellulose, methyl cellulose, hydroxyethyl methyl cellulose or ethyl hydroxyethyl cellulose, or xanthan gum product, characterized in that it further comprises salts of aluminium-, ferro-, ferri-, zinc-, nickel-, tin(2)- or tin(4)-cations, and nitrilo-tri-acetic acid, 1,2-cyclo-hexan-di-amin-N,N,N',N'-tetra-acetic acid, di-ethylen-tri-amine-penta-acetic acid, ethylen-di-oxy-bis(ethylen-nitrilo)-tetra-acetic acid, (N-(2-hydroxy-ethyl)-ethylen-diamin-N, N',N',tri-acetic acid, tri-ethylen-tetra-amine-hexa-acetic acid or N-(hydroxyethyl) ethylene-di-amine-tri-acetic acid as a ligand. The product can be used especially as a drilling mud additive.

20 Claims, No Drawings

MODIFIED CELLULOSE PRODUCTS

FIELD OF THE INVENTION

The invention relates to aluminium modified cellulose products. These products can be used as drilling-, completion- and work-over fluids additives used in the drilling of subterranean oil-, gas- and water wells. In particular, the invention provides water-soluble components which provide shale inhibiting-, thermostability-, viscosifing- and fluid loss reducing properties comparable to those of an oil based drilling fluid, without the adverse effects of an oil- or pseudo-oil based mud.

BRIEF DESCRIPTION OF PRIOR ART

A rotary system is the most common form of drilling a subterranean well. This system depends upon the rotation of the column of drill pipe to the bottom of which is attached a multi prolonged drilling bit. The drill bit cuts into the earth, causing to accumulate cuttings as drilling continues. As a result, a fluid must be used to carry these cuttings to the surface for removal, thus allowing the bit to continue functioning and the bottom of the hole to be kept clean and free of cuttings at all times.

When the drilling process is on going, the drilling fluid has to protect the borehole wall from deformation and/or deterioration resulting from reactions of the sediments or formation with the liquid and other containing elements of the said fluid. These chemical and/or physical reactions are resulting from the osmotic and/or crystalline effects. These sensitive formations are classified as shales and need to be stabilised. By "shales" is meant to refer to materials from the smectic group such as bentonite and the like, claystone and "gumbo"-type colloidal-clay substances seen in subterranean formations, and related substances which posses the property of hydrodynamic volume increase when exposed to aqueous environments. Shale stabilisation is believed to at least partially be dependent upon inhibition of swelling and dispersion process of the shale by the fluid.

Shales and shale reactions are extensively described in literature like: Van Olphen, H., "An Introduction to Clay Colloid Chemistry", second edition, John Wiley & Sons, New York, 19977, p. 30; and Darley, H. C. H. and Gray, George R., "Compositions and Properties of Drilling and Completion Fluids" 5th edition, Gulf Publishing Company, Houston, p. 140.

To transfer the cuttings to the surface, the fluid has to posses a certain rheology to carry and suspend the solids. The viscosifying components of the ingredients of the drilling fluid are designed for this purpose.

Further, the drilling fluid has to prevent or at least reduce the introduction of fluid, salts and solids into the formation.

The temperature increase, due to reaching greater depths of the well, will reduce the viscosity and causes the deterioration of the components of the drilling fluid.

As the drilling process has reached its target depth, the well has to be prepared for its function as oil- or gas producer, water- or gas- or cutting-injector or as water well. This phase is referred to as completion phase. Very often the drilling fluid will be exchanged for a so called completion fluid to bring the well to completion.

After a certain time period the well is reduced in its function and has to be repaired. The fluid used during this operation is called as a work-over fluid.

Some cellulose derivatives do posses inhibiting-, viscosifying-, fluid loss reducing- and and thermostabilizing properties but by a chemical and/or physical treatment these phenomenon can be enhanced. Cellulose polymers like carboxy methyl cellulose (CMC), poly anionic cellulose, hydroxy ethyl cellulose and all other cellulose derivatives can be modified by cross- and block linking in the process of the synthesis.

In Russian patent RU 2001936 the application of so-called carboalumilon is reported. The ligand in this case is Trilon B (ethylene-di-amin-tetra acetic acid), a commercial product from BASF in Germany. The preparation of carboalumilon is not mentioned in RU 2001936 nor any detail of the synthesis is given nor physical or chemical properties.

DESCRIPTION OF THE INVENTION

We have discovered that certain colloids based on cellulose derivatives are acting as inhibitors-, viscosifying and fluid loss reducing and thermostability improving agents in water based drilling-, completion- and work-over fluid and are from synthesis of cellulose with chemicals to be described below.

The products can be used in technical or purified form.

The invention and some of its preferable embodiments are presented in the claims.

In the search for improved inhibiting-, viscosifying-, fluid loss reducing- and thermostabilizing properties of cellulose derivatives, a modifying ability of certain ligands and cations was utilised. The positive effect here is achieved by means of cross linking of cellulose macromolecules the cations and ligands. Further, as the drilling process is continued, the temperature of the sediment will increase depending on the nature of the formation properties. Specially when applied in a horizontal well profile the duration of higher temperature exposure is extended. The mentioned additives will provide a protection against deterioration caused by the elevated temperature of the formation.

The cellulose product may be a cellulose ether, such as carboxymethyl cellulose (CMC), hydroxyethyl cellullose (HEC), carboxymethyl hydroxyethyl cellulose (CMHEC), methyl cellulose (MC), hydroxyethyl methyl cellulose (HMEC) or ethyl hydroxyethyl cellulose (EHEC), or a xanthan gum product.

Molecules of the complex formers link cellulose molecules via aluminium-, ferro-, ferri-, zinc-, nickel-, tin(2)- and tin(4)-cations.

The amount of the salt used counted as percent based on dry cellulose may be in the range 0.1–20 wt %, preferably 0.5–5 wt %. The amount of the ligand used may be in the range 0.1–20 wt %, preferably 0.5–5 wt %.

The products have the ability to improve the interaction of drilling fluids, containing this product, and the clays/shales of the formation to be drilled through, and afterwards, exposed drilled formation to the said drilling fluid.

Especially the products have the ability to improve temperature stability of the mud system added to a water based drilling fluid, and the ability to reduce fluid loss when applied in drilling fluids for the payzone.

The products are also applicable in brines, like NaCl, KCl, NaBr, Na-formate, K-formate and Ce-formate for drilling purposes, completion and work-over fluids.

Increasing thermostability of drilling fluids treated with cellulose derivatives like CMC was obtained especially by addition of water soluble aluminium salts like $Al_2(SO_4)_3$ resulting in more stability to high temperatures.

The especially advantageous effect of the added aluminium salts can be explained by the inhibiting action of aluminium cations increasing the alkali nature of the water solution of the drilling fluid due to the formed complex compositions. In these formed complex compositions a role of linking agents (ligands) can be performed by hydroxyls, water molecules and the cellulose macro molecules, which form multi valence- and co-ordinating links with the aluminium cations by means of carboxyl and hydroxyls. In this case the positive effect of cross linking of cellulose macromolecules by three valence aluminium cations is utilised.

In the process of synthesis of aluminium modified cellulose derivatives, partial substitution of sodium ions of cellulose macro molecules for aluminium ions takes place. The introduction of aluminium cations can decrease to a certain degree the solubility of the finished product.

Besides the increased thermostability and stability to salts aluminium modified cellulose derivatives have inhibiting effects on clays.

In this case the main linking agent (ligand) of the formed complexes are CMC molecules, but beside them there can be molecules of other compounds, which are able to form complexes with polyvalent cations. By introduction of certain ligands in the complex it is possible to influence on purpose the properties of the complex.

E.g. nitrilo-tri-acetic acid (NTA) or its sodium salt; or 1,2-cyclo-hexan-di-amin-N,N,N',N'-tetra-acetic acid; or di-ethylen-tri-amine-penta-acetic acid (DTPA); or ethylen-di-oxy-bis(ethylen-nitrilo)-tetra-acetic acid; or (N-(2-hydroxy-ethyl)-ethylen-diamin-N, N',N', tri-acetic-tri-sodium salt; or tri-ethylen-tetra-amine-hexa-acetic acid; N-(hydroxyethyl) ethylene-di-amine-tri-acetic acid ($Na_3HEDTA$) can be used as such a ligand.

Selection of tri-sodium salt of nitrilo-tri-acetic acid (NTA) as used in our process is more effective as can be seen from the application tests. It is more environmentally friendly, too. NTA has 4 donor-groups in its structure and does not give raise to uncontrolled cross-linking.

Synthesis

There is a lot of literature about the manufacture of cellulose ethers. Generally, cellulose ethers are prepared by mixing wood-based or cotton wool-based raw material with a reaction medium, such as alcohol or acetone, and by mercerising it with an alkali substance, such as sodium hydroxide, to activate the cellulose. An etherifying chemical e.g. monochloracetic acid (MCA) in liquid form or its Na-salt (NaMCA) is added and it is allowed to react. The end product can be neutralised. The viscosity can be reduced if needed. By-products, such as salts generated in the reaction, are washed out with alcohol, for example, when purified cellulose ether is manufactured, but they can also be left in the product or only removed partly (technical or crude cellulose ether). The solvent used is separated and the product is dried. The particle size and the bulk density can be adjusted by grinding the product into powder or by granulating it. The product can also be screened to desired particle size. The aluminium compound and complexing ligand can be added to the cellulose ether at any point of the production before the drying of the product, but preferred is the addition at the begin of the reaction after the feeding of the MCA. For a purified product the additives can as well be applied after the washing step.

DETAILED EXAMPLES OF PREPARATION

Example 0

(Zero-trial; No Additives)

65 g of wood pulp (Metsä-Botnia, moisture 8 w-%), 263 g of ethanol, and 26 g of water were mixed together in a closed glass flask which was provided with a mixer and a nitrogen atmosphere as an option. The flask was placed in a water bath. 65 g of sodium hydroxide, diluted with 65 g of water, was added and the cellulose was mercerised for 30 minutes at 20° C. 72 g of monochloracetic acid, diluted with 18 g of water was added. The temperature was raised to 70° C. and the reaction took place for 60 minutes at 70° C. CMC was neutralised with hydrochloric acid. For the technical product (Sample 0/T) ethanol was recovered and the product was dried at 80° C. to a moisture content of less than 8%.

For the purified product (Sample 0/P) the product was washed twice in 1 kg of 75 w-% ethanol and once in 1 kg of 90 w-% ethanol. In between the washing steps the filtrate was separated from the product by filtration through a Büchner filter. After washing the ethanol was recovered and the product was dried at 80° C. to a moisture content of less than 8%.

Example 1

65 g of wood pulp (Metsä-Botnia, moisture 8%), 263 g of ethanol, and 26 g of water were mixed together in a closed glass flask which was provided with a mixer and a nitrogen atmosphere as an option. The flask was placed in a water bath. 65 g of sodium hydroxide, diluted with 65 g of water, was added and the cellulose was mercerised for 30 minutes at 20° C. 72 g of monochloracetic acid, diluted with 18 g of water was added, followed by 3,2 g of aluminium sulphate $Al_2(SO_4)_3$ dissolved in 7 g of water and 2 g of tri-sodium salt of nitrilo-tri-acetic acid (Trilon A, BASF) diluted with 10 g of ethanol. The temperature was raised to 70° C., and the reaction took place for 60 minutes at 70° C. CMC was neutralised with hydrochloric acid.

For the technical product (Sample 1/T) ethanol was recovered and the product was dried at 80° C. to a moisture content of less than 8%.

For the purified product (Sample 1/P) the product was washed twice in 1 kg of 75 w-% ethanol and once in 1 kg of 90 w-% ethanol. In between the washing steps the filtrate was separated from the product by filtration through a Büchner filter. After washing the ethanol was recovered and the product was dried at 80° C. to a moisture content of less than 8%.

Example 2

65 g of cotton pulp (Temming, moisture 8%), 300 g of ethanol, and 30 g of water were mixed together in a closed glass flask which was provided with a mixer and a nitrogen atmosphere. The flask was placed in a water bath. 65 g of sodium hydroxide, diluted with 65 g of water, was added and the cellulose was mercerised for 30 minutes at 20° C. 72 g of monochloracetic acid, diluted with 18 g of water was added followed by 3,2 g of aluminium sulphate $Al_2(SO_4)_3$ dissolved in 7 g of water and 2 g of tri-sodium salt of hydroxy-ethyl-ethylene di-amine acetic acid (Trilon D, BASF) diluted with 10 g of ethanol. The temperature was rised to 70° C. and the reaction took place for 60 minutes at 70° C. CMC was neutralised with hydrochloric acid.

For the technical product (Sample 2/T) ethanol was recovered and the product was dried at 80° C. to a moisture content of less than 8%.

For the purified product (Sample 2/P) the product was washed twice in 1 kg of 75 w-% ethanol and once in 1 kg of 90 w-% ethanol. In between the washing steps the filtrate was separated from the product by filtration through a Büchner filter. After washing the ethanol was recovered and the product was dried at 80° C. to a moisture content of less than 8%.

Examples 3–5

Samples 3, 4 and 5 were prepared according to the procedure described in example 2, and 2 g of Trilon B, A and C was added respectively. Trilon B, BASF, is a tetra-sodium salt of ethylene-di-amine tetra acetic acid and Trilon C, BASF, is a penta-sodium salt of di-ethylene-tri-amine penta acetic acid.

TABLE 1

Typical parameters for the various product

| Example | Sample of products (P = purified and T = technical) | Trilon type used | DS | Viscosity of a 2% solution mPas P-sample | Viscosity of a 2% solution mPas T-sample | pH |
|---|---|---|---|---|---|---|
| 0. | Sample-0/P and -0/T | — | 1.05 | 1300 | 160 | 7.4 |
| 1. | Sample-1/P and -1/T | A | 1.08 | 1800 | 200 | 6.7 |
| 2. | Sample-2/P and -2/T | D | 1.04 | 4100 | 550 | 6.7 |
| 3. | Sample-3/P and -3/T | B | 1.05 | 5000 | 590 | 7.8 |
| 4. | Sample-4/P and -4/T | A | 1.03 | 4800 | 560 | 6.7 |
| 5. | Sample-5/P and -5/T | C | 1.09 | 5900 | 730 | 6.6 |

Examples of the Application of the Aluminium Modified CMC

Procedure I

As shale inhibiting test the so called hot rolling test is performed by measuring the dispersability of bentonite chips. In a hot rolling bomb, containing 500 ml volume, described as an Inconel bottom closed cylinder and cap closed and secured by a cap, 100 g of bentonite chips suspended in drilling fluid. The bomb is pressurised by nitrogen. The bomb is than for 16 hours at 200° F. (93° C.) hot rolled in a so called hot rolling oven.

A hot rolling oven running at approximately 40 rpm equipped with roller bars and temperature controlling devices and timers.

The cylinder containing the fluid and suspended chips is after expiring 16 hours taken out the oven and cooled in a waterbath. When the cell reaches room temperature the pressure is released and the cell opened. The contents is poured onto a 1.18 mm sieve with a receiver. The sieve and receiver is put onto a sieve shaker to make sure that as much as possible of the fluid is removed from the chips.

The chips, on the sieve, are then washed with cold fresh water to clean of the adhering mud from the chips. The chips are then transferred in a container and put in an oven to dry till constant weight.

Correction for the moisture content of the chips and the known start weight makes it possible to determine the recovered sample quantity.

The more material is recovered on the sieve the better the inhibiting action will be.

In a drilling fluid the above mentioned products are applied in various concentrations to demonstrate the recovery quality of the additives in a simulated mud. The results are mentioned in table 2.

TABLE 2

Shale inhibiting test results:

| Product | Recovery % of: Purified product | Recovery % of: Technical product |
|---|---|---|
| Base mud | 34 | 33 |
| as 1. + 2% Sample of example-0/P or-0/T | 53 | 52 |
| as 1. + 2% Sample of example-1/P or-1/T | 100 | 98 |
| as 1. + 2% Sample of example-2/P or-2/T | 98 | 97 |
| as 1. + 2% Sample of example-3/P or-3/T | 81 | 76 |
| as 1. + 2% Sample of example-4/P or-4/T | 99 | 98 |
| as 1. + 2% Sample of example-5/P or-5/T | 98 | 94 |

Procedure II

The modification of the described products was targeted to temperature resistance properties. The slurries were prepared by mixing for 5 minutes and after last addition was made, another additional mixing of 20 minutes was maintained in a mud-mixed at 11.000 rpm.

Hot rolling was done as is described in Example 1 without using the bentonite chips. Test temperatures were varied and the hot rolling time was 16 hours.

After hot rolling the API fluid loss is determined according to API 13 B/1 section III. The results are given in table 3.

TABLE 3

Thermostability testing

| Mud composition | API Fluid Loss at various temperatures after hot rolling for 16 hours, in ml 25° C. | 150° C. | 180° C. |
|---|---|---|---|
| Base mud (70 g/l bentonite + 311 g/l NaCl + 10 g/l CaCl$_2$ + 10 g/l MgCl$_2$) | 15.0 | 28.0 | 70.0 |
| as 1. + 3% Sample of example-0 | 8.0 | 15.0 | 45.0 |
| as 1. + 3% Sample of example-1 | 3.5 | 5.9 | 28.5 |
| as 1 + 3% Sample of example-3 | 5.4 | 9.1 | 36.5 |
| as 1 + 3% Sample of example-4 | 3.1 | 5.4 | 25.0 |

The test results show that Trilon A, C, and D give better properties both as to shale inhibition and thermostability.

What is claimed is:

1. A modified cellulose product having less than 8% water, and comprising cellulose ether or xanthan gum product, a salt of aluminum-, ferro-, ferri-, zinc-, nickel-, tin(2)- or tin(4)-cations, and nitrilo-tri-acetic acid, 1,2-cyclo-hexan-di-amin-N,N,N',N'-tetra-acetic acid, di-ethylene-tri-amine-penta-acetic acid, ethylene-di-oxy-bis(ethylene-nitrilo)-tetra-aceticacid,(N-(2-hydroxy-ethyl)-ethylene-diamino-N, N',N',tri-acetic acid, tri-ethylene-tetra-amine-hexa-acetic acid or N-(hydroxyethyl) ethylene-di-amine-tri-acetic acid as a ligand.

2. A product according to claim 1, wherein the cellulose ether is carboxymethyl cellulose, hydroxyethyl cellulose, carboxymethyl hydroxyethyl cellulose, methyl cellulose, hydroxyethyl methyl cellulose or ethyl hydroxyethyl cellulose.

3. A product according to claim 1, wherein the salt is water soluble.

4. A product according to claim 1, wherein the cation is aluminium.

5. A product according to claim 4, wherein the salt is aluminium sulphate.

6. A product according to claim 1, wherein the ligand is nitrilo-tri-acetic acid, di-ethylen-tri-amine-penta-acetic acid or N-(hydroxyethyl) ethylene-di-amine-tri-acetic.

7. A product according to claim 1, wherein the salt used counted as percent based on dry cellulose is 0.1–20 wt %.

8. A product according to claim 1, wherein the salt used is 0.5–5 wt %.

9. A product according to claim 1, wherein the ligand used is 0.1–20 wt %.

10. A product according to claim 9, wherein the ligand used is 0.5–5 wt %.

11. A product comprising the modified cellulose according to claim 1, wherein the ligand is tri-sodium salt of nitrilo-tri-acetic acid.

12. A product comprising the modified cellulose according to claim 1, wherein the ligand is tri-sodium salt of hydroxy-ethyl-ethylene-di-amine-acetic acid.

13. A product comprising the modified cellulose according to claim 1, wherein the ligand is penta-sodium salt of di-ethylene-tri-amine-penta-acetic acid.

14. A dry composition comprising a modified cellulose product according to claim 1.

15. A modified cellulose product having less than 8% water, and comprising cellulose ether or xanthan gum product, a salt of aluminum-, ferro-, ferri-, zinc-, nickel-, tin(2)- or tin(4)-cations, and a ligand.

16. A method for the preparation of a modified cellulose product, wherein cellulose material is mixed with a reaction medium, and reacted with a monochloracetic acid, an aluminum salt, and nitrilo-tri-acetic acid, 1,2-cyclohexan-di-amin-N,N,N',N'-tetra-acetic acid, di-ethylene-tri-amine-penta-acetic acid, ethylene-di-oxy-bis(ethylene-nitrilo)-tetra-acetic acid, (N-(2-hydroxy-ethyl)-ethylene-diamin-N,N',N',tri-acetic acid, tri-ethylene-tetra-amine-hexa-acetic acid, N (hydroxyethyl) ethylene-di-amine-tri-acetic, or a salt thereof.

17. The method according to claim 16, wherein tri-sodium salt of nitrilo-tri-acetic acid, tri-sodium salt of hydroxy-ethyl-ethylene-di-amine-acetic acid, or penta-sodium salt of di-ethylene-tri-amine-penta-acetic acid is a ligand, and the reaction takes place at 70° C.

18. A Method according to claim 16, wherein the cellulose compound is carboxymethyl cellulose, hydroxyethyl cellulose, carboxymethyl hydroxyethyl cellulose, methyl cellulose, hydroxyethyl methyl cellulose, ethyl hydroxyethyl cellulose or xanthan gum product.

19. The method according to claim 16, wherein tri-sodium salt of nitrilo-tri-acetic acid, tri-sodium salt of hydroxy-ethyl-ethylene-di-amine-acetic acid, or penta-sodium salt of di-ethylene-tri-amine-penta-acetic acid is a ligand, and the reaction takes place for 60 minutes.

20. A method for the preparation of a modified cellulose product, wherein cellulose material is mixed with a reaction medium, and reacted with a monochloracetic acid, an aluminum salt, and a ligand.

\* \* \* \* \*

UNITED STATES PATENT AND TRADEMARK OFFICE
CERTIFICATE OF CORRECTION

PATENT NO. : 6,303,544 B1
DATED : October 16, 2001
INVENTOR(S) : Maas et al.

It is certified that error appears in the above-identified patent and that said Letters Patent is hereby corrected as shown below:

Column 6,
Line 55, reads "aceticacid" should read -- acetic acid --
Line 67, reads "aluminium" should read -- aluminum --

Column 7,
Line 2, reads "aluminium" should read -- aluminum --

Signed and Sealed this

First Day of October, 2002

*Attest:*

JAMES E. ROGAN
*Attesting Officer*     *Director of the United States Patent and Trademark Office*